United States Patent
Takatsuji et al.

(10) Patent No.: US 7,462,421 B2
(45) Date of Patent: Dec. 9, 2008

(54) LITHIUM ION SECONDARY BATTERY

(75) Inventors: Hideyasu Takatsuji, Moriguchi (JP); Masaya Okochi, Osaka (JP); Yosuke Kita, Osaka (JP); Ryoichi Tanaka, Izumiotsu (JP); Shoichiro Watanabe, Nara (JP)

(73) Assignee: Panasonic Corporation, Osaka (JP)

( * ) Notice: Subject to any disclaimer, the term of this patent is extended or adjusted under 35 U.S.C. 154(b) by 567 days.

(21) Appl. No.: 10/771,411

(22) Filed: Feb. 5, 2004

(65) Prior Publication Data

US 2004/0157125 A1 Aug. 12, 2004

(30) Foreign Application Priority Data

Feb. 12, 2003 (JP) ............... 2003-033374

(51) Int. Cl.
*H01M 4/58* (2006.01)
(52) U.S. Cl. ............... 429/218.1; 429/231.95; 429/231.6; 429/231.9
(58) Field of Classification Search ............... None
See application file for complete search history.

(56) References Cited

U.S. PATENT DOCUMENTS 6,783,890 B2 * 8/2004 Kweon et al. ............ 429/218.1
6,805,996 B2 * 10/2004 Hosoya ..................... 429/94
7,150,940 B2 * 12/2006 Okochi et al. ............ 429/231.3

FOREIGN PATENT DOCUMENTS

| JP | 06-150929 | * 5/1994 |
| JP | 06-168722 | 6/1994 |
| JP | P2000-123834 | 4/2000 |
| JP | P2002-203553 | 7/2002 |

* cited by examiner

*Primary Examiner*—Patrick Ryan
*Assistant Examiner*—Julian Mercado
(74) *Attorney, Agent, or Firm*—McDermott Will & Emery LLP

(57) ABSTRACT

A positive electrode active material for a lithium ion secondary battery is a lithium-containing composite oxide represented by the chemical formula: $Li_a(Co_{1-x-y}Mg_xAl_y)_bM_zO_c$, where M is at least one element selected from the group consisting of Na and K, and the values a, b, c, x, y and z respectively satisfy $0 \leq a \leq 1.05$, $0.005 \leq x \leq 0.15$, $0.0001 \leq y \leq 0.01$, $0.0002 \leq z \leq 0.008$, $0.85 \leq b \leq 1.1$ and $1.8 \leq c \leq 2.1$.

This makes it possible to improve a high temperature storage characteristics and safety of the lithium ion secondary battery.

3 Claims, 1 Drawing Sheet

LITHIUM ION SECONDARY BATTERY

BACKGROUND OF THE INVENTION

The present invention relates to a lithium ion secondary battery and particularly, to the improvement of a positive electrode.

Currently, the positive electrode active material of lithium ion secondary batteries used is typically a lithium-containing composite oxide such as $LiCoO_2$. $LiCoO_2$, however, has its limits in terms of capacity, safety, etc. As such, usually cobalt (Co) in $LiCoO_2$ is partially substituted by other element(s) to improve the characteristics thereof.

Japanese Laid-Open Patent Publication No. Hei 6-168722, for example, proposes to partially substitute Co of $LiCoO_2$ with magnesium (Mg) for cycle characteristic improvement. Japanese Laid-Open Patent Publication No. 2002-203553 proposes the partial substitution of $LiCoO_2$ with at least one selected from the group consisting of aluminum (Al), chromium (Cr), vanadium (V), manganese (Mn) and iron (Fe) and with at least one selected from the group consisting of Mg and calcium (Ca) for battery capacity improvement as well as for preventing the battery temperature from rising during overcharge.

Moreover, Japanese Laid-Open Patent Publication No. 2000-123834 proposes to use raw materials with high purity to reduce the concentrations of impurities introduced during production, namely, iron (Fe), copper (Cu), sodium (Na), silicon (Si) and nickel (Ni) to not greater than 0.03%, 0.005%, 0.1%, 0.1% and 0.15%, respectively, for preventing the reduction of initial capacity.

In view of the above, the present inventors have studied the partial substitution of Co with a small amount of Mg and a trace amount of Al in order to improve the battery capacity and the battery safety against internal short-circuit and overcharge.

However, $LiCoO_2$ in which Co is partially substituted by a small amount of Mg and a trace amount of Al has had defects such as the deterioration of storage characteristics and the generation of significant amount of gases such as CO and $CO_2$, by dissolving of Mg during high temperature storage.

The present inventors have further conducted extensive studies thereon and found that, among the impurities contained in raw materials during production, sodium (Na) and potassium (K), even trace amounts thereof, have enormous influence on the above-mentioned problems. When Co sites are substituted by certain amounts of sodium and potassium in a crystal structure, the crystal structure is stabilized and the dissolving of Mg during high temperature storage is prevented. When the amount is too large, however, an oxide of sodium or potassium is produced to generate $O_2$.

The amounts of impurities can be reduced by using raw materials with high purity. As is clear from the above, there are preferred amount ranges of sodium and potassium. However, the crystal structure is not stabilized by such amounts as are contained as impurities.

Accordingly, the present invention is intended to solve the above problem and provides a lithium ion secondary battery superior in high temperature storage characteristics and safety by using raw materials with high purity and separately adding certain amounts of sodium and potassium salts thereto to optimize the contents of sodium and potassium in a positive electrode active material (i.e. $LiCoO_2$) in which Co is partially substituted by a small amount of Mg and a trace amount of Al.

BRIEF SUMMARY OF THE INVENTION

The lithium ion secondary battery of the present invention is characterized by comprising: a positive electrode including a positive electrode active material comprising a lithium-containing composite oxide, a conductive material and a binder; a negative electrode; and a non-aqueous electrolyte, wherein the lithium-containing composite oxide is represented by the chemical formula:

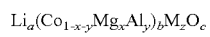

$$Li_a(Co_{1-x-y}Mg_xAl_y)_bM_zO_c$$

where M is at least one element selected from the group consisting of Na and K, and the values a, b, c, x, y and z respectively satisfy $0 \leq a \leq 1.05$, $0.005 \leq x \leq 0.15$, $0.0001 \leq y \leq 0.01$, $0.0002 \leq z \leq 0.008$, $0.85 \leq b \leq 1.1$ and $1.8 \leq c \leq 2.1$.

The binder preferably comprises polyvinylidene fluoride having a mean molecular weight of 150000 to 350000.

In the lithium ion secondary battery of the present invention, Co constituting a crystal structure of the lithium-containing composite oxide as the positive electrode active material is partially substituted by Na atoms and K atoms; thereby the crystal structure is stabilized and the dissolving of Mg into an electrolyte during high temperature storage is prevented, resulting in prevention of the deterioration of storage characteristics. In the present invention, it is possible to control the amounts of Na and K to be added by using raw materials with high purity and therefore the effect as mentioned above can be obtained without fail.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
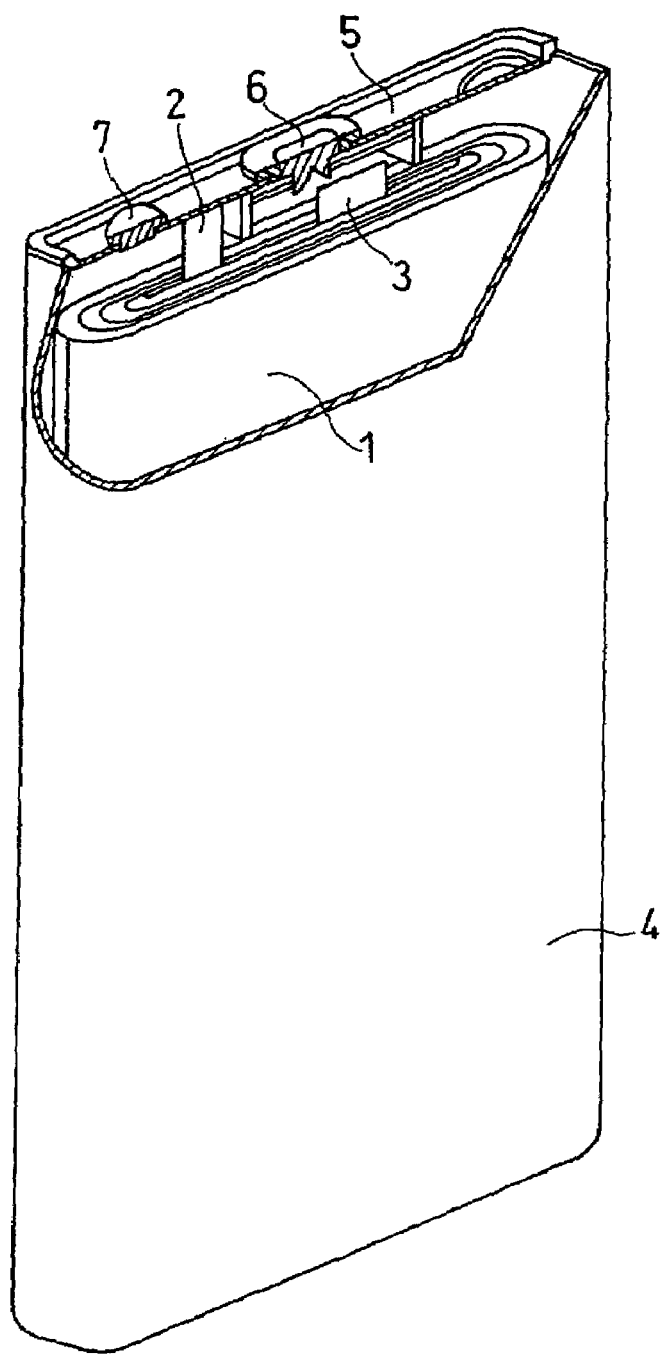
FIG. 1 is a partially cutaway oblique view of a prismatic lithium ion secondary battery of the present invention.

The feature of the present invention is to use, as the positive electrode active material of a lithium ion secondary battery, a lithium-containing composite oxide represented by the chemical formula: $Li_a(Co_{1-x-y}Mg_xAl_y)_bM_zO_c$, where M is at least one element selected from the group consisting of Na and K, and the values a, b, c, x, y and z respectively satisfy $0 \leq a \leq 1.05$, $0.005 \leq x \leq 0.15$, $0.0001 \leq y \leq 0.01$, $0.0002 \leq z \leq 0.008$, $0.85 \leq b \leq 1.1$ and $1.8 \leq c \leq 2.1$.

This enables Na and K to exist in the crystal structure of the lithium-containing composite oxide in a preferred ratio, thereby preventing the dissolving of Mg into an electrolyte during high temperature storage and the deterioration of storage characteristics.

When the value a exceeds 1.05, $Li_2O$ or $Li_2CO_3$ is produced, which is then decomposed to generate gases such as $O_2$ and $CO_2$.

When the value b is less than 0.85, the stabilization of the crystal structure becomes insufficient and the cycle characteristics are degraded. Conversely, when the value b exceeds 1.1, $CoCO_3$ is produced and gases such as $CO_2$ are generated.

When the value c is less than 1.8, the crystal structure becomes oxygen deficient, leading to the insufficient stabilization thereof, which impairs the cycle characteristics. Conversely, when the value c exceeds 2.1, O2 gas is generated.

When the value x representing the amount of magnesium is less than 0.005, the stabilization of the crystal structure of the lithium-containing composite oxide becomes insufficient. Accordingly, the repetition of charging and discharging increases internal resistance to greatly decrease the cycle characteristics. On the other hand, when the value x exceeds 0.15, a large amount of $O_2$ gas is generated along with the production of MgO during high temperature storage to expand the battery and degrade the charge/discharge cycle characteristics.

When the value y representing the amount of aluminum is less than 0.0001, the stabilization of the crystal structure of the lithium-containing composite oxide becomes insufficient. Therefore, the repetition of charging and discharging increases internal resistance to greatly decrease the cycle characteristics. Conversely, when the value y exceeds 0.01, the charge and discharge capacities of the active material is lowered, or the tap density of the active material particles is decreased to reduce the capacity of an electrode.

When the value z representing the amount of sodium or potassium is less than 0.0002, the stabilization of the crystal structure of the lithium-containing composite oxide becomes insufficient. Thereby, Mg dissolves out into an electrolyte during storage at high temperatures to decrease the capacity of the battery. On the other hand, when the value z exceeds 0.008, an oxide of sodium or potassium is produced and the amount of $O_2$ gas generated is increased to expand the battery. Accordingly, the difference between the battery thickness before storage and that after storage is increased.

The positive electrode active material is prepared by baking, for example, a lithium salt, a magnesium salt, an aluminum salt, a cobalt salt, a sodium salt and a potassium salt at a high temperature in an oxidizing atmosphere. The lithium salt may be any known lithium salt with high purity. Particularly, lithium carbonate with high purity is preferably used. The magnesium salt may be any known magnesium salt with high purity. Particularly, magnesium sulfate with high purity is preferably used. The cobalt salt may be any known cobalt salt. Particularly, cobalt sulfate is preferably used. The cobalt salt hardly contains alkaline metals as impurities, and therefore an ordinary cobalt salt with purity at industrial level is enough. As the sodium salt and potassium salt, any known salt can be used and, preferably, carbonates.

The positive electrode is produced by applying a positive electrode material mixture on a current collector made of, for example, a metal foil such as Ni, which is then rolled and dried.

The positive electrode material mixture is prepared by mixing the positive electrode active material described above and conventionally used conductive material, binder and dispersion medium.

The conductive material is preferably carbon black, powdered graphite or carbon fiber.

The binder may be any of thermoplastic resin, thermosetting resin and any mixture thereof. Among them, polyvinylidene fluoride (hereinafter referred to as "PVdF") and polytetrafluoroethylene (hereinafter referred to as "PTFE") are preferred and more preferably, PVdF.

Further, PVdF having a mean molecular weight of 150000 to 350000 is particularly preferred. In the case of using PVdF with a mean molecular weight of not less than 150000, the binding force of the positive electrode material mixture is increased so that a trace amount thereof can offer sufficient strength. Besides, a smaller amount of the binder with insulation is required so that the internal resistance is reduced, creating synergistic effects such as the improvement of load characteristics of battery and the enhancement of cycle characteristics. In the case of using PVdF with a mean molecular weight of over 350000, however, the load and cycle characteristics are likely to be lowered.

As the dispersion medium, an aqueous dispersion medium or an organic dispersion medium such as N-methyl-2-pyrrolidone can be used.

The negative electrode is produced by applying a negative electrode material mixture on a current collector made of, for example, a metal foil such as Cu, which is then rolled and dried.

The negative electrode material mixture is prepared by mixing a negative electrode material, a binder and a dispersion medium. As the binder and the dispersion medium, the same materials listed for the positive electrode in the above can be used.

The negative electrode material is preferably a carbonaceous material. Preferred carbonaceous material is a composite material comprising a core particle of graphite and amorphous carbon covering at least a part of the surface of the core particle. Even if magnesium dissolves from the positive electrode, the use of this material can prevent the degradation of negative electrode characteristics. This is because magnesium is incorporated into the amorphous carbon on the surface and magnesium is intercalated between layers of the graphite. As a result, capacity degradation during high temperature storage can be further improved.

In the case where the positive and negative electrodes are in the form of sheet, it is preferred that the material mixture layer is formed on both sides of the current collector. The material mixture layer on one side of the current collector may comprise a plurality of layers. In addition to the material mixture layer, there may be provided a protective layer without the active material and an undercoat layer formed directly on the current collector. Alternatively, an intermediate layer or the like may be formed between the material mixture layers.

As the non-aqueous electrolyte, a non-aqueous solvent containing a lithium salt can be used. The non-aqueous solvent may be any solvent which is conventionally used for lithium secondary batteries such as a cyclic carbonate and a linear carbonate. A conventionally known additive may be added to the non-aqueous electrolyte.

As the lithium salt, $LiBF_4$, $LiPF_6$ or any mixture thereof may be used. Among them, it is preferred to use $LiPF_6$ singly. The concentration of the lithium salt in the non-aqueous electrolyte is not specifically limited, but preferably 0.2 to 2 mol/L, more preferably 0.5 to 1.5 mol/L.

In the following, examples of the present invention are described in detail.

EXAMPLE 1

A prismatic lithium ion secondary battery as shown in FIG. 1 was produced by the procedure described below. FIG. 1 is a partially cutaway oblique view of a prismatic lithium ion secondary battery of the present invention.

(1) Preparation of Positive Electrode Active Material

An aqueous solution containing 0.947 mol/L of cobalt sulfate, 0.05 mol/L of magnesium sulfate with a purity of 99.999% and 0.003 mol/L of aluminum sulfate with a purity of 99.999% was continuously supplied to a reaction vessel using a buret. After the aqueous solution was added dropwise with stirring at room temperature, the solution was neutralized with NaOH to give a hydroxide comprising $Co_{0.947}Mg_{0.05}Al_{0.003}(OH)_2$ as a precursor. Incidentally, an electric balance with a precision of four places of decimals was used for the preparation of the material.

The resultant precursor, lithium carbonate with a purity of 99.999% and sodium carbonate with a purity of 99.999% were mixed such that the molar ratio of Li:Co:Mg:Al:Na was 1:0.947:0.05:0.003:0.001, in other words, such that a positive electrode active material having a composition of $LiCo_{0.947}Mg_{0.05}Al_{0.003}Na_{0.001}O_2$ was obtained. The mixture was then prebaked at 600° C. for 10 hours, and pulverized. The pulverized baked mixture was baked again at 900° C. for 10 hours, which was then pulverized and sieved to give a powdered positive electrode active material. The concentration of each element contained in the obtained positive electrode active material was measured by ICP emission spectroscopy, in order to accurately obtain the total amount of each element which was the added amount and the mixed amount as an impurity. As a result, the concentration of Mg was 12500 ppm, that of Al was 840 ppm, that of Na was 240 ppm and that of K was 5 ppm. The value of Co was determined from these analytical values such that the total amount of main transition metals was 1, and it was found that the positive electrode active material had a composition of $LiCu_{0.947}Mg_{0.05}Al_{0.003}Na_{0.001}O_2$.

(2) Production of Positive Electrode

A positive electrode material mixture paste was prepared by adding 100 parts by weight of the positive electrode active material prepared above, 1.5 parts by weight of acetylene black as a conductive material and 2 parts by weight of polyvinylidene fluoride (PVdF) with a mean molecular weight of 300000 as a binder to a solution of N-methyl-2-pyrrolidone, which was then mixed with stirring. The obtained positive electrode material mixture was applied onto both faces of a 15 μm-thick current collector made of aluminum foil, which was then dried, rolled and cut into a predetermined size to give a positive electrode.

(3) Production of Negative Electrode

A negative electrode material mixture paste was prepared by mixing with stirring 100 parts by weight of flake graphite as a negative electrode active material, an aqueous solution containing 1 part by weight of carboxymethyl cellulose as a thickener and 2 parts by weight of styrene butadiene rubber as a binder. The obtained negative electrode material mixture was applied onto both faces of a 10 μm-thick current collector made of copper foil, which was then dried, rolled and cut into a predetermined size to give a negative electrode.

(4) Assembly of Battery

The positive and negative electrodes produced above were spirally wound with a 20 Mm-thick microporous separator made of polyethylene interposed therebetween to give an electrode assembly 1. The ends of a positive electrode lead 2 and a negative electrode lead 3 were welded to the positive electrode and the negative electrode, respectively. An insulating ring made of polyethylene (not shown in the figure) was installed on the top of the electrode assembly 1, which was then housed in a battery case 4 made of aluminum. The other end of the positive electrode lead 2 was spot-welded to an aluminum sealing plate 5. The other end of the negative electrode lead 3 was spot-welded to the underside of a negative electrode terminal 6 made of nickel provided in the center of the sealing plate 5. The opening end of the battery case 4 and the periphery of the sealing plate 5 were laser welded. Then, a predetermined amount of non-aqueous electrolyte was fed into the battery case 4 from an inlet. The non-aqueous electrolyte was prepared by dissolving $LiPF_6$ in a solvent mixture of ethylene carbonate, ethyl methyl carbonate and diethyl carbonate at a volume ratio of 3:5:2 at a $LiPF_6$ concentration of 0.9 mol/L. Finally, a sealing stopper 7 made of aluminum was placed on the inlet, which was then laser welded to the sealing plate 5 to give a prismatic lithium ion secondary battery (hereinafter referred to as "Battery") 1A having a structure as shown in FIG. 1. Battery had a designed capacity of 680 mAh, a thickness of 5.2 mm, a width of 34 mm and a height of 36 mm.

EXAMPLE 2

A hydroxide comprising $Co_{0.992}Mg_{0.005}Al_{0.003}(OH)_2$ as a precursor was prepared in the same manner as in EXAMPLE 1, except that an aqueous solution containing 0.992 mol/L of cobalt sulfate, 0.005 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.992:0.005:0.003:0.001, in other words, such that a positive electrode active material with a composition of $Li(Co_{0.992}Mg_{0.005}Al_{0.003}Na_{0.001})O_2$ was obtained. Then, the positive electrode active material was analyzed for the concentration of each element by ICP emission spectroscopy to find that the concentration of Mg was 1240 ppm, that of Al was 838 ppm, that of Na was 240 ppm and that of K was 5 ppm. The value of Co was determined from these analytical values such that the total amount of main transition metals was 1, and it was found that the positive electrode active material had a composition of $LiCu_{0.992}Mg_{0.05}Al_{0.003}Na_{0.001}O_2$.

Battery 2A was produced in the same manner as in EXAMPLE 1 except that the thus-obtained positive electrode active material was used.

EXAMPLE 3

A hydroxide comprising $Co_{0.847}Mg_{0.15}Al_{0.003}(OH)_2$ as a precursor was prepared in the same manner as in EXAMPLE 1, except that an aqueous solution containing 0.847 mol/L of cobalt sulfate, 0.150 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.847:0.15:0.003:0.001, in other words, such that a positive electrode active material with a composition of $LiCo_{0.847}Mg_{0.15}Al_{0.003}Na_{0.001}O_2$ was obtained.

Then, the positive electrode active material was analyzed for the concentration of each element by ICP emission spectroscopy to find that the concentration of Mg was 37500 ppm, that of Al was 841 ppm, that of Na was 240 ppm and that of K was 5 ppm. The value of Co was determined from these analytical values such that the total amount of main transition metals was 1, and it was found that the positive electrode active material had a composition of $LiCo_{0.8471}Mg_{0.1499}Al_{0.003}Na_{0.001}O_2$.

Battery 3A was produced in the same manner as in EXAMPLE 1 except that the thus-obtained positive electrode active material was used.

EXAMPLE 4

A hydroxide comprising $Co_{0.9499}Mg_{0.05}Al_{0.0001}(OH)_2$ as a precursor was prepared in the same manner as in EXAMPLE 1, except that an aqueous solution containing 0.9499 mol/L of cobalt sulfate, 0.05 mol/L of magnesium sulfate with a purity of 99.999% and 0.0001 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.9499:0.05:0.0001:0.001, in other words, such that a positive electrode active material with a composition of $LiCu_{0.9499}Mg_{0.05}Al_{0.0001}Na_{0.001}O_2$ was obtained.

Then, the positive electrode active material was analyzed for the concentration of each element by ICP emission spectroscopy to find that the concentration of Mg was 12600 ppm, that of Al was 14 ppm, that of Na was 235 ppm and that of K was 5 ppm. The value of Co was determined from these analytical values such that the total amount of main transition metals was 1, and it was found that the positive electrode active material had a composition of $LiCo_{0.9495}Mg_{0.0504}Al_{0.000}Na_{0.001}O_2$.

Battery 4A was produced in the same manner as in EXAMPLE 1 except that the thus-obtained positive electrode active material was used.

EXAMPLE 5

A hydroxide comprising $Co_{0.9495}Mg_{0.05}Al_{0.0005}(OH)_2$ as a precursor was prepared in the same manner as in EXAMPLE 1, except that an aqueous solution containing 0.9495 mol/L of cobalt sulfate, 0.05 mol/L of magnesium sulfate with a purity of 99.999% and 0.0005 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.9495:0.05:0.0005:0.001, in other words, such that a positive electrode active material with a composition of $LiCu_{0.9495}Mg_{0.05}Al_{0.0005}Na_{0.001}O_2$ was obtained.

Then, the positive electrode active material was analyzed for the concentration of each element by ICP emission spectroscopy to find that the concentration of Mg was 12500 ppm, that of Al was 142 ppm, that of Na was 243 ppm and that of K was 5 ppm. The value of Co was determined from these analytical values such that the total amount of main transition metals was 1, and it was found that the positive electrode active material had a composition of $LiCo_{0.9495}Mg_{0.05}Al_{0.0005}Na_{0.001}O_2$.

Battery 5A was produced in the same manner as in EXAMPLE 1 except that the thus-obtained positive electrode active material was used.

EXAMPLE 6

A hydroxide comprising $Co_{0.945}Mg_{0.05}Al_{0.0005}(OH)_2$ as a precursor was prepared in the same manner as in EXAMPLE 1, except that an aqueous solution containing 0.945 mol/L of cobalt sulfate, 0.05 mol/L of magnesium sulfate with a purity of 99.999% and 0.005 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.945:0.05:0.005:0.001, in other words, such that a positive electrode active material with a composition of $LiCu_{0.945}Mg_{0.05}Al_{0.005}Na_{0.001}O_2$ was obtained.

Then, the positive electrode active material was analyzed for the concentration of each element by ICP emission spectroscopy to find that the concentration of Mg was 12600 ppm, that of Al was 1390 ppm, that of Na was 245 ppm and that of K was 5 ppm. The value of Co was determined from these analytical values such that the total amount of main transition metals was 1, and it was found that the positive electrode active material had a composition of $LiCo_{0.9446}Mg_{0.0504}Al_{0.005}Na_{0.001}O_2$.

Battery 6A was produced in the same manner as in EXAMPLE 1 except that the thus-obtained positive electrode active material was used.

EXAMPLE 7

A hydroxide comprising $Co_{0.94}Mg_{0.05}Al_{0.01}(OH)_2$ as a precursor was prepared in the same manner as in EXAMPLE 1, except that an aqueous solution containing 0.94 mol/L of cobalt sulfate, 0.05 mol/L of magnesium sulfate with a purity of 99.999% and 0.01 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.94:0.05:0.01:0.001, in other words, such that a positive electrode active material with a composition of $LiCu_{0.94}Mg_{0.05}Al_{0.01}Na_{0.001}O_2$ was obtained.

Then, the positive electrode active material was analyzed for the concentration of each element by ICP emission spectroscopy to find that the concentration of Mg was 12500 ppm, that of Al was 2800 ppm, that of Na was 245 ppm and that of K was 5 ppm. The value of Co was determined from these analytical values such that the total amount of main transition metals was 1, and it was found that the positive electrode active material had a composition of $LiCu_{0.94}Mg_{0.05}Al_{0.01}Na_{0.001}O_2$.

Battery 7A was produced in the same manner as in EXAMPLE 1 except that the thus-obtained positive electrode active material was used.

EXAMPLE 8

A hydroxide comprising $Co_{0.947}Mg_{0.05}Al_{0.003}(OH)_2$ as a precursor was prepared in the same manner as in EXAMPLE 1, except that an aqueous solution containing 0.947 mol/L of cobalt sulfate, 0.05 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.947:0.05:0.003:0.0002, in other words, such that a positive electrode active material with a composition of $LiCo_{0.947}Mg_{0.05}Al_{0.003}Na_{0.0002}O_2$ was obtained.

Then, the positive electrode active material was analyzed for the concentration of each element by ICP emission spectroscopy to find that the concentration of Mg was 12490 ppm, that of Al was 842 ppm, that of Na was 48 ppm and that of K was 5 ppm. The value of Co was determined from these analytical values such that the total amount of main transition metals was 1, and it was found that the positive electrode active material had a composition of $LiCo_{0.9471}Mg_{0.0499}Al_{0.003}Na_{0.0002}O_2$.

Battery 8A was produced in the same manner as in EXAMPLE 1 except that the thus-obtained positive electrode active material was used.

EXAMPLE 9

A hydroxide comprising $Co_{0.947}Mg_{0.05}Al_{0.003}(OH)_2$ as a precursor was prepared in the same manner as in EXAMPLE 1, except that an aqueous solution containing 0.947 mol/L of cobalt sulfate, 0.05 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.947:0.05: 0.003:0.008, in other words, such that a positive electrode active material with a composition of $LiCo_{0.947}Mg_{0.05}Al_{0.003}Na_{0.08}O_2$ was obtained.

Then, the positive electrode active material was analyzed for the concentration of each element by ICP emission spectroscopy to find that the concentration of Mg was 12510 ppm, that of Al was 840 ppm, that of Na was 1900 ppm and that of K was 6 ppm. The value of Co was determined from these analytical values such that the total amount of main transition metals was 1, and it was found that the positive electrode active material had a composition of $LiCo_{0.947}Mg_{0.05}Al_{0.003}Na_{0.008}O_2$.

Battery 9A was produced in the same manner as in EXAMPLE 1 except that the thus-obtained positive electrode active material was used.

EXAMPLE 10

A hydroxide comprising $Co_{0.947}Mg_{0.05}Al_{0.003}(OH)_2$ as a precursor was prepared in the same manner as in EXAMPLE 1, except that an aqueous solution containing 0.947 mol/L of cobalt sulfate, 0.05 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and potassium carbonate were mixed such that the molar ratio of Li:Co:Mg:Al:K was 1:0.947:0.05: 0.003:0.0002, in other words, such that a positive electrode active material with a composition of $LiCo_{0.947}Mg_{0.05}Al_{0.003}K_{0.0002}O_2$ was obtained.

Then, the positive electrode active material was analyzed for the concentration of each element by ICP emission spectroscopy to find that the concentration of Mg was 12520 ppm, that of Al was 842 ppm, that of Na was 5 ppm and that of K was 80 ppm. The value of Co was determined from these analytical values such that the total amount of main transition metals was 1, and it was found that the positive electrode active material had a composition of $LiCo_{0.947}Mg_{0.05}Al_{0.003}K_{0.0002}O_2$.

Battery 10A was produced in the same manner as in EXAMPLE 1 except that the thus-obtained positive electrode active material was used.

EXAMPLE 11

A hydroxide comprising $Co_{0.947}Mg_{0.05}Al_{0.003}(OH)_2$ as a precursor was prepared in the same manner as in EXAMPLE 1, except that an aqueous solution containing 0.947 mol/L of cobalt sulfate, 0.05 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and potassium carbonate were mixed such that the molar ratio of Li:Co:Mg:Al:K was 1:0.947:0.05: 0.003:0.008, in other words, such that a positive electrode active material with a composition of $LiCo_{0.947}Mg_{0.05}Al_{0.003}K_{0.008}O_2$ was obtained.

Then, the positive electrode active material was analyzed for the concentration of each element by ICP emission spectroscopy to find that the concentration of Mg was 12500 ppm, that of Al was 842 ppm, that of Na was 6 ppm and that of K was 3230 ppm. The value of Co was determined from these analytical values such that the total amount of main transition metals was 1, and it was found that the positive electrode active material had a composition of $LiCo_{0.947}Mg_{0.05}Al_{0.003}K_{0.008}O_2$.

Battery 11A was produced in the same manner as in EXAMPLE 1 except that the thus-obtained positive electrode active material was used.

EXAMPLE 12

Battery 12A was produced in the same manner as in EXAMPLE 1, except that PVdF with a mean molecular weight of 150000 was used as a binder for the positive electrode.

EXAMPLE 13

Battery 13A was produced in the same manner as in EXAMPLE 1, except that PVdF with a mean molecular weight of 100000 was used as a binder for the positive electrode.

EXAMPLE 14

Battery 14A was produced in the same manner as in EXAMPLE 1, except that PVdF with a mean molecular weight of 400000 was used as a binder for the positive electrode.

COMPARATIVE EXAMPLE 1

A hydroxide comprising $Co_{0.997}Al_{0.003}(OH)_2$ as a precursor was prepared in the same manner as in EXAMPLE 1, except that an aqueous solution containing 0.997 mol/L of cobalt sulfate and 0.003 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Al:Na was 1:0.997:0.003:0.001, in other words, such that a positive electrode active material with a composition of $LiCo_{0.997}Al_{0.003}Na_{0.001}O_2$ was obtained.

Then, the positive electrode active material was analyzed for the concentration of each element by ICP emission spectroscopy to find that the concentration of Mg was 6 ppm, that of Al was 842 ppm, that of Na was 241 ppm and that of K was 5 ppm. The value of Co was determined from these analytical values such that the total amount of main transition metals was 1 and it was found that the positive electrode active material had a composition of $LiCo_{0.997}Al_{0.003}Na_{0.001}O_2$.

Battery 1B was produced in the same manner as in EXAMPLE 1 except that the thus-obtained positive electrode active material was used.

COMPARATIVE EXAMPLE 2

A hydroxide comprising $Co_{0.797}Mg_{0.2}Al_{0.003}(OH)_2$ as a precursor was prepared in the same manner as in EXAMPLE 1, except that an aqueous solution containing 0.797 mol/L of cobalt sulfate, 0.2 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.797:0.2:0.003:0.001, in other words, such that a positive electrode active material with a composition of $LiCo_{0.797}Mg_{0.2}Al_{0.003}Na_{0.001}O_2$ was obtained.

Then, the positive electrode active material was analyzed for the concentration of each element by ICP emission spectroscopy to find that the concentration of Mg was 50000 ppm, that of Al was 841 ppm, that of Na was 243 ppm and that of K was 6 ppm. The value of Co was determined from these analytical values such that the total amount of main transition metals was 1, and it was found that the positive electrode active material had a composition of $LiCo_{0.7972}Mg_{0.1998}Al_{0.003}Na_{0.001}O_2$.

Battery 2B was produced in the same manner as in EXAMPLE 1 except that the thus-obtained positive electrode active material was used.

COMPARATIVE EXAMPLE 3

A hydroxide comprising $Co_{0.95}Mg_{0.05}(OH)_2$ as a precursor was prepared in the same manner as in EXAMPLE 1, except that an aqueous solution containing 0.95 mol/L of cobalt sulfate and 0.05 mol/L of magnesium sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Na was 1:0.95:0.05:0.001, in other words, such that a positive electrode active material with a composition of $LiCo_{0.95}Mg_{0.05}Na_{0.001}O_2$ was obtained.

Then, the positive electrode active material was analyzed for the concentration of each element by ICP emission spectroscopy to find that the concentration of Mg was 12500 ppm, that of Al was 4 ppm, that of Na was 240 ppm and that of K was 5 ppm. The value of Co was determined from these analytical values such that the total amount of main transition metals was 1, and it was found that the positive electrode active material had a composition of $LiCo_{0.95}Mg_{0.05}Na_{0.001}O_2$.

Battery 3B was produced in the same manner as in EXAMPLE 1 except that the thus-obtained positive electrode active material was used.

COMPARATIVE EXAMPLE 4

A hydroxide comprising $Co_{0.9}Mg_{0.05}Al_{0.05}(OH)_2$ as a precursor was prepared in the same manner as in EXAMPLE 1, except that an aqueous solution containing 0.9 mol/L of cobalt sulfate, 0.05 mol/L of magnesium sulfate with a purity of 99.999% and 0.05 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.9:0.05:0.05:0.001, in other words, such that a positive electrode active material with a composition of $LiCo_{0.9}Mg_{0.05}Al_{0.05}Na_{0.001}O_2$ was obtained.

Then, the positive electrode active material was analyzed for the concentration of each element by ICP emission spectroscopy to find that the concentration of Mg was 12510 ppm, that of Al was 13900 ppm, that of Na was 244 ppm and that of K was 5 ppm. The value of Co was determined from these analytical values such that the total amount of main transition metals was 1, and it was found that the positive electrode active material had a composition of $LiCo_{0.9}Mg_{0.05}Al_{0.05}Na_{0.001}O_2$.

Battery 4B was produced in the same manner as in EXAMPLE 1 except that the thus-obtained positive electrode active material was used.

COMPARATIVE EXAMPLE 5

A hydroxide comprising $Co_{0.947}Mg_{0.05}Al_{0.003}(OH)_2$ as a precursor was prepared in the same manner as in EXAMPLE 1, except that an aqueous solution containing 0.947 mol/L of cobalt sulfate, 0.05 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor and lithium carbonate were mixed such that the molar ratio of Li:Co:Mg:Al was 1:0.947:0.05:0.003, in other words, such that a positive electrode active material with a composition of $LiCo_{0.947}Mg_{0.05}Al_{0.003}O_2$ was obtained.

Then, the positive electrode active material was analyzed for the concentration of each element by ICP emission spectroscopy to find that the concentration of Mg was 12510 ppm, that of Al was 842 ppm, that of Na was 5 ppm and that of K was 5 ppm. The value of Co was determined from these analytical values such that the total amount of main transition metals was 1, and it was found that the positive electrode active material had a composition of $LiCo_{0.947}Mg_{0.05}Al_{0.003}O_2$.

Battery 5B was produced in the same manner as in EXAMPLE 1 except that the thus-obtained positive electrode active material was used.

COMPARATIVE EXAMPLE 6

A hydroxide comprising $Co_{0.947}Mg_{0.05}Al_{0.003}(OH)_2$ as a precursor was prepared in the same manner as in EXAMPLE 1, except that an aqueous solution containing 0.947 mol/L of cobalt sulfate, 0.05 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.947:0.05:0.003:0.0001, in other words, such that a positive electrode active material with a composition of $LiCo_{0.947}Mg_{0.05}Al_{0.003}Na_{0.0001}O_2$ was obtained.

Then, the positive electrode active material was analyzed for the concentration of each element by ICP emission spectroscopy to find that the concentration of Mg was 12490 ppm, that of Al was 841 ppm, that of Na was 24 ppm and that of K was 5 ppm. The value of Co was determined from these analytical values such that the total amount of main transition metals was 1, and it was found that the positive electrode active material had a composition of $LiCo_{0.947}Mg_{0.05}Al_{0.003}Na_{0.0001}O_2$.

Battery 6B was produced in the same manner as in EXAMPLE 1 except that the thus-obtained positive electrode active material was used.

COMPARATIVE EXAMPLE 7

A hydroxide comprising $Co_{0.947}Mg_{0.05}Al_{0.003}(OH)_2$ as a precursor was prepared in the same manner as in EXAMPLE 1, except that an aqueous solution containing 0.947 mol/L of cobalt sulfate, 0.05 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and sodium carbonate were mixed such that the molar ratio of Li:Co:Mg:Al:Na was 1:0.947:0.05:0.003:0.01, in other words, such that a positive electrode active material with a composition of $LiCo_{0.947}Mg_{0.05}Al_{0.003}Na_{0.01}O_2$ was obtained.

Then, the positive electrode active material was analyzed for the concentration of each element by ICP emission spectroscopy to find that the concentration of Mg was 12500 ppm, that of Al was 840 ppm, that of Na was 2380 ppm and that of K was 5 ppm. The value of Co was determined from these analytical values such that the total amount of main transition metals was 1, and it was found that the positive electrode active material had a composition of $LiCo_{0.947}Mg_{0.05}Al_{0.003}Na_{0.01}O_2$.

Battery 7B was produced in the same manner as in EXAMPLE 1 except that the thus-obtained positive electrode active material was used.

COMPARATIVE EXAMPLE 8

A hydroxide comprising $Co_{0.947}Mg_{0.05}Al_{0.003}(OH)_2$ as a precursor was prepared in the same manner as in EXAMPLE 1, except that an aqueous solution containing 0.947 mol/L of cobalt sulfate, 0.05 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the obtained precursor, lithium carbonate with a purity of 99.999% and potassium carbonate at a concentration of 0.0001 mol/L were mixed such that the molar ratio of Li:Co:Mg:Al:K was 1:0.947:0.05:0.003:0.0001, in other words, such that a positive electrode active material with a composition of $LiCo_{0.947}Mg_{0.05}Al_{0.003}K_{0.0001}O_2$ was obtained.

The obtained positive electrode active material was analyzed for the concentration of each element by ICP emission spectroscopy to find that the concentration of Mg was 12500 ppm, that of Al was 838 ppm, that of Na was 5 ppm and that of K was 40 ppm. The value of Co was determined from these analytical values such that the total amount of main transition metals was 1, and it was found that the positive electrode active material had a composition of $LiCo_{0.947}Mg_{0.05}Al_{0.003}K_{0.0001}O_2$.

Battery 8B was produced in the same manner as in EXAMPLE 1 except that the thus-obtained positive electrode active material was used.

COMPARATIVE EXAMPLE 9

A hydroxide comprising $Co_{0.947}Mg_{0.05}Al_{0.003}(OH)_2$ as a precursor was prepared in the same manner as in EXAMPLE 1, except that an aqueous solution containing 0.947 mol/L of cobalt sulfate, 0.05 mol/L of magnesium sulfate with a purity of 99.999% and 0.003 mol/L of aluminum sulfate with a purity of 99.999% was used. A powdered positive electrode active material was prepared in the same manner as in EXAMPLE 1, except that the above-obtained precursor, lithium carbonate and potassium carbonate were mixed such that the molar ratio of Li:Co:Mg:Al:K was 1:0.947:0.05:0.003:0.01, in other words, such that a positive electrode active material with a composition of $LiCo_{0.947}Mg_{0.05}Al_{0.003}K_{0.01}O_2$ was obtained.

Then, the positive electrode active material was analyzed for the concentration of each element by ICP emission spectroscopy to find that the concentration of Mg was 12510 ppm, that of Al was 839 ppm, that of Na was 5 ppm and that of k was 4000 ppm. The value of Co was determined from these analytical values such that the total amount of main transition metals was 1, and it was found that the positive electrode active material had a composition of $LiCo_{0.947}Mg_{0.05}Al_{0.003}K_{0.0099}O_2$.

Battery 9B was produced in the same manner as in EXAMPLE 1 except that the thus-obtained positive electrode active material was used.

The chemical formulas of the positive electrode active materials in EXAMPLEs 1 to 14 and COMPARATIVE EXAMPLEs 1 to 9 determined from the amounts to add materials and those determined from the analytical values are tabulated in Tables 1 and 2.

TABLE 1

| | | Composition of lithium-containing composite oxide | |
|---|---|---|---|
| | Battery No. | Chemical formula determined from amount to add materials | Chemical formula determined from analytical value |
| Ex. 1 | 1A | $LiCo_{0.947}Mg_{0.05}Al_{0.003}Na_{0.001}O_2$ | $LiCo_{0.947}Mg_{0.05}Al_{0.003}Na_{0.001}O_2$ |
| Ex. 2 | 2A | $LiCo_{0.9920}Mg_{0.005}Al_{0.003}Na_{0.001}O_2$ | $LiCo_{0.9920}Mg_{0.005}Al_{0.003}Na_{0.001}O_2$ |
| Ex. 3 | 3A | $LiCo_{0.847}Mg_{0.15}Al_{0.003}Na_{0.001}O_2$ | $LiCo_{0.8471}Mg_{0.1499}Al_{0.003}Na_{0.001}O_2$ |
| Ex. 4 | 4A | $LiCo_{0.9499}Mg_{0.05}Al_{0.0001}Na_{0.001}O_2$ | $LiCo_{0.9495}Mg_{0.0504}Al_{0.0001}Na_{0.001}O_2$ |
| Ex. 5 | 5A | $LiCo_{0.9495}Mg_{0.05}Al_{0.0005}Na_{0.001}O_2$ | $LiCo_{0.9495}Mg_{0.05}Al_{0.0005}Na_{0.001}O_2$ |
| Ex. 6 | 6A | $LiCo_{0.945}Mg_{0.05}Al_{0.005}Na_{0.001}O_2$ | $LiCo_{0.9446}Mg_{0.0504}Al_{0.005}Na_{0.001}O_2$ |
| Ex. 7 | 7A | $LiCo_{0.940}Mg_{0.05}Al_{0.01}Na_{0.001}O_2$ | $LiCo_{0.940}Mg_{0.05}Al_{0.01}Na_{0.001}O_2$ |
| Ex. 8 | 8A | $LiCo_{0.947}Mg_{0.05}Al_{0.003}Na_{0.0002}O_2$ | $LiCo_{0.9471}Mg_{0.0499}Al_{0.003}Na_{0.0002}O_2$ |
| Ex. 9 | 9A | $LiCo_{0.947}Mg_{0.05}Al_{0.003}Na_{0.008}O_2$ | $LiCo_{0.947}Mg_{0.05}Al_{0.003}Na_{0.008}O_2$ |
| Ex. 10 | 10A | $LiCo_{0.947}Mg_{0.05}Al_{0.003}K_{0.0002}O_2$ | $LiCo_{0.947}Mg_{0.05}Al_{0.003}K_{0.0002}O_2$ |
| Ex. 11 | 11A | $LiCo_{0.947}Mg_{0.05}Al_{0.003}K_{0.008}O_2$ | $LiCo_{0.947}Mg_{0.05}Al_{0.003}K_{0.008}O_2$ |
| Ex. 12 | 12A | $LiCo_{0.947}Mg_{0.05}Al_{0.003}Na_{0.001}O_2$ | $LiCo_{0.947}Mg_{0.05}Al_{0.003}Na_{0.001}O_2$ |
| Ex. 13 | 13A | $LiCo_{0.947}Mg_{0.05}Al_{0.003}Na_{0.001}O_2$ | $LiCo_{0.947}Mg_{0.05}Al_{0.003}Na_{0.001}O_2$ |
| Ex. 14 | 14A | $LiCo_{0.947}Mg_{0.05}Al_{0.003}Na_{0.001}O_2$ | $LiCo_{0.947}Mg_{0.05}Al_{0.003}Na_{0.001}O_2$ |

TABLE 2

| | Battery No. | Composition of lithium-containing composite oxide | |
|---|---|---|---|
| | | Chemical formula determined from amount to add materials | Chemical formula determined from analytical value |
| Comp. Ex. 1 | 1B | $LiCo_{0.997}Al_{0.003}Na_{0.001}O_2$ | $LiCo_{0.997}Al_{0.003}Na_{0.001}O_2$ |
| Comp. Ex. 2 | 2B | $LiCo_{0.797}Mg_{0.2}Al_{0.003}Na_{0.001}O_2$ | $LiCo_{0.7972}Mg_{0.1998}Al_{0.003}Na_{0.001}O_2$ |
| Comp. Ex. 3 | 3B | $LiCo_{0.95}Mg_{0.05}Na_{0.001}O_2$ | $LiCo_{0.95}Mg_{0.05}Na_{0.001}O_2$ |
| Comp. Ex. 4 | 4B | $LiCo_{0.9}Mg_{0.05}Al_{0.05}Na_{0.001}O_2$ | $LiCo_{0.9}Mg_{0.05}Al_{0.05}Na_{0.001}O_2$ |
| Comp. Ex. 5 | 5B | $LiCo_{0.947}Mg_{0.05}Al_{0.003}O_2$ | $LiCo_{0.947}Mg_{0.05}Al_{0.003}O_2$ |
| Comp. Ex. 6 | 6B | $LiCo_{0.947}Mg_{0.05}Al_{0.003}Na_{0.0001}O_2$ | $LiCo_{0.947}Mg_{0.05}Al_{0.003}Na_{0.0001}O_2$ |
| Comp. Ex. 7 | 7B | $LiCo_{0.947}Mg_{0.05}Al_{0.003}Na_{0.01}O_2$ | $LiCo_{0.947}Mg_{0.05}Al_{0.003}Na_{0.01}O_2$ |
| Comp. Ex. 8 | 8B | $LiCo_{0.947}Mg_{0.05}Al_{0.003}K_{0.0001}O_2$ | $LiCo_{0.947}Mg_{0.05}Al_{0.003}K_{0.0001}O_2$ |
| Comp. Ex. 9 | 9B | $LiCo_{0.947}Mg_{0.05}Al_{0.003}K_{0.01}O_2$ | $LiCo_{0.947}Mg_{0.05}Al_{0.003}K_{0.01}O_2$ |

[Battery Evaluation]

Each battery of EXAMPLEs 1 to 14 and COMPARATIVE EXAMPLEs 1 to 9 was put through the following evaluation.

(i) Charge/Discharge Cycle Characteristics

At an ambient temperature of 20° C., the battery was first charged at a constant voltage of 4.20 V with a maximum current of 680 mA for 2 hours, and then discharged at a constant current of 680 mA with an end-of-voltage of 2.75 V. This cycle was repeated. Then, the ratio of discharge capacity at 500 cycles to the initial capacity was referred to as "capacity retention ratio A."

(ii) High Temperature Storage Characteristics

At an ambient temperature of 20° C., the battery was first charged at a constant voltage of 4.20 V with a maximum current of 680 mA for 2 hours, and then discharged at a constant current of 680 mA with an end-of-voltage of 2.75 V. This cycle was repeated twice to measure the discharge capacity at 2 cycles.

Subsequently, the battery in a charged state was stored at 85° C. for 3 days. The battery after the storage was again subjected to 2 cycles of charge and discharge with the same conditions as above. Then, the ratio of discharge capacity at 2 cycles after the high temperature storage to the discharge capacity at 2 cycles before the storage was referred to as "capacity retention ratio B."

(iii) Initial Rate Characteristics

At an ambient temperature of 20° C., the battery was first charged at a constant voltage of 4.20 V with a maximum current of 680 mA for 2 hours, and then discharged at a constant current of 136 mA with an end-of-voltage of 2.75 V. The discharge capacity at this time was measured. Subsequently, the battery was charged at a constant voltage of 4.20 V with a maximum current of 680 mA for 2 hours, and then discharged at a constant current of 1360 mA with an end-of-discharge-voltage of 2.75 V. The discharge capacity at this time was measured. The ratio of discharge capacity when discharged at a discharge current of 1360 mA to the discharge capacity when discharged at a discharge current of 136 mA was evaluated as "initial rate characteristics."

(iv) Change of Battery Thickness

The thickness of the battery having the battery voltage of 4.2V in a charged state was measured. Then, the battery was stored at 60° C. for 20 days and subsequently at room temperature for more than 5 hours. The battery thickness was measured, and the difference between the battery thickness before the storage and that after the storage was determined.

(v) Positive Electrode Utilization Rate

At an ambient temperature of 20° C., the battery was first charged at a constant voltage of 4.20 V with a maximum current of 680 mA for 2 hours, and then discharged at a constant current of 680 mA with an end-of-voltage of 2.75 V. The discharge capacity at this time was divided by the weight of the positive electrode active material to yield a positive electrode utilization rate.

The evaluation results obtained from the above procedure are shown in Tables 3 and 4.

TABLE 3

| | Battery No. | Molecular weight of PVdF | Capacity retention ratio (%) A | Capacity retention ratio (%) B | Battery expansion after storage (mm) | Positive electrode utilization rate (mAh/g) | Initial rate characteristics (%) |
|---|---|---|---|---|---|---|---|
| Ex. 1 | 1A | 350000 | 89 | 93 | 0.71 | 138.4 | 92 |
| Ex. 2 | 2A | 350000 | 86 | 94 | 0.52 | 136.2 | 92 |
| Ex. 3 | 3A | 350000 | 89 | 94 | 0.85 | 135.1 | 93 |
| Ex. 4 | 4A | 350000 | 90 | 93 | 0.72 | 139.4 | 93 |
| Ex. 5 | 5A | 350000 | 88 | 94 | 0.69 | 138.9 | 92 |
| Ex. 6 | 6A | 350000 | 89 | 95 | 0.75 | 137.6 | 92 |
| Ex. 7 | 7A | 350000 | 89 | 95 | 0.87 | 136.3 | 92 |
| Ex. 8 | 8A | 350000 | 89 | 96 | 0.77 | 138.7 | 92 |
| Ex. 9 | 9A | 350000 | 88 | 94 | 0.78 | 133.3 | 92 |
| Ex. 10 | 10A | 350000 | 88 | 95 | 0.77 | 137.6 | 92 |
| Ex. 11 | 11A | 350000 | 87 | 94 | 0.78 | 131.8 | 93 |
| Ex. 12 | 12A | 150000 | 88 | 93 | 0.58 | 136.0 | 93 |

TABLE 3-continued

|  | Battery No. | Molecular weight of PVdF | Capacity retention ratio (%) | | Battery expansion after storage (mm) | Positive electrode utilization rate (mAh/g) | Initial rate characteristics (%) |
| --- | --- | --- | --- | --- | --- | --- | --- |
|  |  |  | A | B |  |  |  |
| Ex. 13 | 13A | 100000 | 84 | 92 | 0.62 | 136.0 | 93 |
| Ex. 14 | 14A | 400000 | 87 | 94 | 0.45 | 136.0 | 89 |

TABLE 4

|  | Battery No. | Molecular weight of PVdF | Capacity retention ratio (%) | | Battery expansion after storage (mm) | Positive electrode utilization rate (mAh/g) | Initial rate characteristics (%) |
| --- | --- | --- | --- | --- | --- | --- | --- |
|  |  |  | A | B |  |  |  |
| Comp. Ex. 1 | 1B | 350000 | 75 | 92 | 0.45 | 136.0 | 92 |
| Comp. Ex. 2 | 2B | 350000 | 88 | 94 | 1.15 | 134.7 | 93 |
| Comp. Ex. 3 | 3B | 350000 | 80 | 95 | 0.70 | 139.4 | 92 |
| Comp. Ex. 4 | 4B | 350000 | 88 | 94 | 0.95 | 125.5 | 93 |
| Comp. Ex. 5 | 5B | 350000 | 89 | 79 | 0.81 | 139.3 | 93 |
| Comp. Ex. 6 | 6B | 350000 | 87 | 92 | 0.75 | 139.3 | 92 |
| Comp. Ex. 7 | 7B | 350000 | 89 | 92 | 0.80 | 124.3 | 92 |
| Comp. Ex. 8 | 8B | 350000 | 88 | 92 | 0.76 | 138.2 | 93 |
| Comp. Ex. 9 | 9B | 350000 | 90 | 93 | 0.79 | 122.4 | 92 |

Battery 1A of EXAMPLE 1 had a greater capacity retention ratio A than Batteries 1B, 3B and 5B of COMPARATIVE EXAMPLEs 1, 3 and 5, and therefore had better cycle characteristics. It also had a greater capacity retention ratio B, and the change in battery thickness thereof was small. Accordingly, Battery 1A had better storage characteristics also.

From the comparison between Batteries 1A, 2A and 3A of EXAMPLEs 1, 2 and 3 and Batteries 1B and 2B of COMPARATIVE EXAMPLEs 1 and 2, it was found that Batteries except Battery 1B containing no magnesium exhibited better cycle characteristics. However, Battery 2B containing an excessive amount of magnesium exhibited a lower positive electrode utilization rate and the battery thickness after high temperature storage increased by more than 1 mm. This has proved that the suitable content of magnesium when Co of lithium-containing composite oxide ($LiCoO_2$) is partially substituted by magnesium is 0.005 to 0.15 molt.

From the comparison between Batteries 4A to 7A of EXAMPLEs 4 to 7 and Batteries 3B and 4B of COMPARATIVE EXAMPLEs 3 and 4, it was found that Batteries except Battery 3B containing no aluminum exhibited better cycle characteristics. However, Battery 4B containing an excessive amount of aluminum exhibited about 10% lower positive electrode utilization rate. This has proved that the suitable content of aluminum when Co of lithium-containing composite oxide ($LiCoO_2$) is partially substituted by aluminum is 0.0001 to 0.01 molt.

From the comparison between Batteries 8A and 9A of EXAMPLEs 8 and 9 and Batteries 5B to 7B of COMPARATIVE EXAMPLEs 5 to 7, it was found that Batteries except Battery 5B containing no sodium exhibited better cycle characteristics. However, Battery 6B containing a trace amount of sodium exhibited no improved storage characteristics, and Battery 7B of COMPARATIVE EXAMPLE 7 containing an excessive amount of sodium had about 11% lower positive electrode utilization rate. This has proved that the suitable content of sodium when Co of lithium-containing composite oxide ($LiCoO_2$) is partially substituted by sodium is 0.0002 to 0.008 mol %.

From the comparison between Batteries 10A and 11A of EXAMPLEs 10 and 11 and Batteries 5B, 8B and 9B of COMPARATIVE EXAMPLEs 5, 8 and 9, it was found that Batteries except Battery 5B containing no potassium exhibited better cycle characteristics. However, Battery 8B containing a trace amount of potassium exhibited no improved storage characteristics, and Battery 9B containing an excessive amount of potassium had about 12% lower positive electrode utilization rate. This has proved that the suitable content of potassium when Co of lithium-containing composite oxide ($LiCoO_2$) is partially substituted by potassium is 0.0002 to 0.008 mol %.

Batteries 1A and 12A to 14A of EXAMPLEs 1 and 12 to 14 were compared, and it was found that Batteries 1A and 12A whose positive electrodes contain PVdF, as a binder, with a mean molecular weight of 150000 to 350000 showed further improvements in terms of initial rate and cycle characteristics. Battery 14A containing PVdF with a mean molecular weight of 400000 exhibited slightly lower initial rate characteristics. In Battery 13A containing PVDF with a mean molecular weight of 100000, the strength of the positive electrode was lowered and the cycle characteristics were slightly degraded.

As described above, the present invention can provide a lithium ion secondary battery superior in high temperature storage characteristics, charge/discharge characteristics and safety by using, as a positive electrode active material, a lithium-containing composite oxide with controlled amounts of sodium and potassium made of raw materials with high purity.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion secondary battery comprising: a positive electrode including a positive electrode active material comprising a lithium-containing composite oxide, a conductive material and a binder;
a negative electrode; and
a non-aqueous electrolyte,
wherein said lithium-containing composite oxide has a structure of lithium cobaltate where Co atoms are partially substituted by Na and/or K atoms and is represented by the chemical formula:

$$Li_a(Co_{1-x-y}Mg_xAl_y)_bM_zO_c$$

where M is at least one element selected from the group consisting of Na and K, and the values a, b, c, x, y and z respectively satisfy $0 \leqq a \leqq 1.05$, $0.005 \leqq x \leqq 0.15$, $0.0001 \leqq y \leqq 0.01$, $0.0002 \leqq z \leqq 0.008$, $0.85 \leqq b \leqq 1.1$ and $1.8 \leqq c \leqq 2.1$.

2. The lithium ion secondary battery in accordance with claim 1, wherein said binder comprises polyvinylidene fluoride having a mean molecular weight of 150000 to 350000.

3. The lithium ion secondary battery in accordance with claim 1, wherein said negative electrode includes a composite material comprising a core particle of graphite and amorphous carbon covering at least a part of the surface of said core particle as a negative electrode material.

* * * * *

UNITED STATES PATENT AND TRADEMARK OFFICE
CERTIFICATE OF CORRECTION

PATENT NO. : 7,462,421 B2
APPLICATION NO. : 10/771411
DATED : December 9, 2008
INVENTOR(S) : Hideyasu Takatsuji et al.

It is certified that error appears in the above-identified patent and that said Letters Patent is hereby corrected as shown below:

In Column 3, Line 2, change "2.1, 02 gas" to --2.1, $O_2$ gas--;

In Column 4, Line 67, change "$Co_{0.947}Mg_{0.05}Al_{0.003}(OH)_2$" to --$Co_{0.947}Mg_{0.05}Al_{0.003}(OH)_2$--;

In Column 5, Line 8, change "$LiCo_{0.947}Mg_{0.05}Al_{0.003}Na_{0.001}O_2$" to --$LiCo_{0.947}Mg_{0.05}Al_{0.003}Na_{0.001}O_2$--;
Line 9, change "600° C. for" to --600° C for--;
Line 10, change "900° C. for" to --900° C for--;
Line 23, change "$LiCu_{0.947}Mg_{0.05}Al_{0.003}Na_{0.001}O_2$" to --$LiCo_{0.947}Mg_{0.05}Al_{0.003}Na_{0.001}O_2$--;
Line 50, change "20 Mm-thick" to --20 μm-thick--;

In Column 6, Line 35, change "$LiCu_{0.992}Mg_{0.05}Al_{0.003}Na_{0.001}O_2$" to --$LiCo_{0.992}Mg_{0.05}Al_{0.003}Na_{0.001}O_2$--;
Line 55, change "$LiCo_{0.847}Mg_{0.15}Al_{0.003}Na_{0.001}O_2$" to --$LiCo_{0.847}Mg_{0.15}Al_{0.003}Na_{0.001}O_2$--;

In Column 7, Line 15, change "$LiCu_{0.9499}Mg_{0.05}Al_{0.0001}Na_{0.001}O_2$" to --$LiCo_{0.9499}Mg_{0.05}Al_{0.0001}Na_{0.001}O_2$--;
Line 43, change "$LiCu_{0.9495}Mg_{0.05}Al_{0.0005}Na_{0.001}O_2$" to --$LiCo_{0.9495}Mg_{0.05}Al_{0.0005}Na_{0.001}O_2$--;

In Column 8, Line 4, change "LiCu$_{0.945}$Mg$_{0.05}$Al$_{0.005}$Na$_{0.001}$O$_2$" to --LiCo$_{0.945}$Mg$_{0.05}$Al$_{0.005}$Na$_{0.001}$O$_2$--;

Line 31, change "LiCu$_{0.94}$Mg$_{0.05}$Al$_{0.01}$Na$_{0.001}$O$_2$" to --LiCo$_{0.94}$Mg$_{0.05}$Al$_{0.01}$Na$_{0.001}$O$_2$--;

Line 40, change "LiCu$_{0.94}$Mg$_{0.05}$Al$_{0.01}$Na$_{0.001}$O$_2$" to --LiCo$_{0.94}$Mg$_{0.05}$Al$_{0.01}$Na$_{0.001}$O$_2$--;

Line 60, change "LiCu$_{0.947}$Mg$_{0.05}$Al$_{0.003}$Na$_{0.0002}$O$_2$" to --LiCo$_{0.947}$Mg$_{0.05}$Al$_{0.003}$Na$_{0.0002}$O$_2$--;

In Column 9, Line 21, change "LiCo$_{0.947}$Mg$_{0.05}$Al$_{0.003}$Na$_{0.08}$O$_2$" to --LiCo$_{0.947}$Mg$_{0.05}$Al$_{0.003}$Na$_{0.08}$O$_2$--;

Line 49, change "LiCo$_{0.947}$Mg$_{0.05}$Al$_{0.003}$K$_{0.0002}$O$_2$" to --LiCo$_{0.947}$Mg$_{0.05}$Al$_{0.003}$K$_{0.0002}$O$_2$--;

In Column 10, Line 10, change "LiCo$_{0.947}$Mg$_{0.05}$Al$_{0.003}$K$_{0.008}$O$_2$" to --LiCo$_{0.947}$Mg$_{0.05}$Al$_{0.003}$K$_{0.008}$O$_2$--;

In Column 13, Line 20, change "LiCo$_{0.947}$Mg$_{0.05}$Al$_{0.003}$Na$_{0.01}$O$_2$" to --LiCo$_{0.947}$Mg$_{0.05}$Al$_{0.003}$Na$_{0.01}$O$_2$--;

In Column 14, Line 2, change "LiCo$_{0.947}$Mg$_{0.05}$Al$_{0.003}$K$_{0.0001}$O$_2$" to --LiCo$_{0.947}$Mg$_{0.05}$Al$_{0.003}$K$_{0.0001}$O$_2$--;

Line 30, change "LiCo$_{0.947}$Mg$_{0.05}$Al$_{0.003}$K$_{0.01}$O$_2$" to --LiCo$_{0.947}$Mg$_{0.05}$Al$_{0.003}$K$_{0.01}$O$_2$--;

In Column 15, Line 22, change "20° C., the" to --20° C, the--;

Line 31, change "20° C., the" to --20° C, the--;

Line 37, change "85° C. for" to --85° C for--;

Line 45, change "20° C., the" to --20° C, the--;

CERTIFICATE OF CORRECTION (continued)
U.S. Pat. No. 7,462,421 B2

In Column 16, Line 32, change "60° C. for" to --60° C for--;
        Line 38, change "20° C., the" to --20° C, the--;

In Column 17, Line 48, change "0.15 molt." to --0.15 mol%.--; and
        Line 59, change "0.01 molt." to --0.01 mol%.--.

Signed and Sealed this

Ninth Day of March, 2010

David J. Kappos
*Director of the United States Patent and Trademark Office*